United States Patent
Yamamoto et al.

(10) Patent No.: US 11,731,393 B2
(45) Date of Patent: Aug. 22, 2023

(54) FIBER-REINFORCED RESIN MATERIAL, METHOD FOR MANUFACTURING SAME, AND FIBER-REINFORCED RESIN STRUCTURE

(71) Applicants: TOYOTA BOSHOKU KABUSHIKI KAISHA, Aichi (JP); NATIONAL UNIVERSITY CORPORATION TOKAI NATIONAL HIGHER EDUCATION AND RESEARCH SYSTEM, Aichi (JP)

(72) Inventors: Tetsuya Yamamoto, Aichi-ken (JP); Kohei Kira, Ehime-ken (JP); SulChan Kim, Aichi-ken (JP); Keisuke Kato, Aichi-ken (JP); Masaaki Nomura, Aichi-ken (JP)

(73) Assignees: TOYOTA BOSHOKU KABUSHIKI KAISHA, Aichi (JP); NATIONAL UNIVERSITY CORPORATION TOKAI NATIONAL HIGHER EDUCATION AND RESEARCH SYSTEM, Aichi (JP)

( * ) Notice: Subject to any disclaimer, the term of this patent is extended or adjusted under 35 U.S.C. 154(b) by 0 days.

(21) Appl. No.: 17/727,537

(22) Filed: Apr. 22, 2022

(65) Prior Publication Data
US 2022/0347964 A1    Nov. 3, 2022

(30) Foreign Application Priority Data
Apr. 29, 2021    (JP) .................................. 2021-076939

(51) Int. Cl.
*B32B 5/16*    (2006.01)
*B32B 27/32*    (2006.01)
(Continued)

(52) U.S. Cl.
CPC ................. *B32B 5/16* (2013.01); *B32B 27/32* (2013.01); *B32B 27/34* (2013.01); *B29C 70/42* (2013.01);
(Continued)

(58) Field of Classification Search
CPC ........... B32B 5/16; B32B 27/32; B32B 27/34; B32B 2250/05; B32B 2250/24;
(Continued)

(56) References Cited

U.S. PATENT DOCUMENTS 9,493,642 B2    11/2016    Kito et al.
9,840,615 B2    12/2017    Kito et al.
(Continued)

FOREIGN PATENT DOCUMENTS

JP    2011006578 A  *   1/2011
JP    2013-147646         8/2013
(Continued)

*Primary Examiner* — John D Freeman
(74) *Attorney, Agent, or Firm* — Greenblum & Bernstein, P.L.C.

(57) ABSTRACT

The fiber-reinforced resin material of the present invention is a fiber-reinforced resin material having a laminated structure in which fiber assembly layers and thermoplastic resin layers are alternately located, wherein the fiber assembly layers are each an assembly of continuous fibers having thermoplastic resin particles attached to surfaces thereof, and the fiber-reinforced resin material has a higher elongation on one surface side than that on the other surface side. The fiber-reinforced resin structure is made of the present fiber-reinforced resin material. A method for manufacturing the present fiber-reinforced resin material includes: a stacking step of stacking a sheet-shaped product of the continuous fibers that serves as the fiber assembly layer and a resin sheet that serves as the thermoplastic resin layer so as to obtain the laminated structure; and a hot-pressing step of heating and (Continued)

compressing a stacked product obtained through the stacking step in a stacking direction.

14 Claims, 8 Drawing Sheets

(51) Int. Cl.
    *B32B 27/34*     (2006.01)
    *B29K 77/00*     (2006.01)
    *B29C 70/42*     (2006.01)
    *B29K 307/04*     (2006.01)
    *B29K 23/00*     (2006.01)

(52) U.S. Cl.
    CPC ...... *B29K 2023/00* (2013.01); *B29K 2077/00* (2013.01); *B29K 2307/04* (2013.01); *B32B 2250/05* (2013.01); *B32B 2250/24* (2013.01); *B32B 2262/106* (2013.01); *B32B 2264/0264* (2013.01)

(58) Field of Classification Search
    CPC ...... B32B 2262/106; B32B 2264/0264; B29C 70/42; B29C 70/003; B29C 70/88; B29C 70/30; B29K 2023/00; B29K 2077/00; B29K 2307/04
    See application file for complete search history.

(56) References Cited

U.S. PATENT DOCUMENTS

| | | | |
|---|---|---|---|
| 2014/0371394 A1 | 12/2014 | Kito et al. | |
| 2017/0029610 A1 | 2/2017 | Kito et al. | |
| 2018/0272656 A1* | 9/2018 | Ohara | B32B 5/26 |
| 2019/0284380 A1 | 9/2019 | Kato | |
| 2020/0283589 A1* | 9/2020 | Geho | C08K 7/02 |

FOREIGN PATENT DOCUMENTS

| | | | | |
|---|---|---|---|---|
| JP | 2017-82060 | | 5/2017 | |
| JP | 2017094505 A | * | 6/2017 | |
| JP | 2018-123284 | | 8/2018 | |
| WO | 2018/021569 | | 8/2018 | |
| WO | WO-2018143298 A1 | * | 8/2018 | C08J 5/04 |
| WO | 2017/150702 | | 1/2019 | |

* cited by examiner

FIBER-REINFORCED RESIN MATERIAL, METHOD FOR MANUFACTURING SAME, AND FIBER-REINFORCED RESIN STRUCTURE

CROSS REFERENCE TO RELATED APPLICATIONS

The present application claims priority under 35 USC § 119 to Japanese Patent Application No. 2021-076939 filed on Apr. 29, 2021, the disclosure of which is hereby expressly incorporated by reference in its entirety.

BACKGROUND OF THE INVENTION

(1) Field of the Invention

The present invention relates to a fiber-reinforced resin material, a method for manufacturing the same, and a fiber-reinforced resin structure. More specifically, the present invention relates to a fiber-reinforced resin material using a thermoplastic resin, a method for manufacturing the same, and a fiber-reinforced resin structure.

(2) Description of Related Art

Conventionally, a composite material referred to as a fiber-reinforced plastic or the like is known. In general, a fiber-reinforced plastic is obtained by coating a fiber assembly such as a glass fiber nonwoven fabric, as a core material, with a resin (matrix resin) as a matrix material, and then curing the resin. At this time, a thermosetting resin is often employed as the matrix resin. From the viewpoint that many thermosetting resins are excellent in fluidity in an uncured state, and easily impregnated into the core material, a thermosetting resin is selected. However, the thermosetting resin has a disadvantage that the thermosetting resin, when cured, becomes brittle and is easily cracked. Therefore, a fiber-reinforced resin material and a fiber-reinforced resin structure that are more hardly cracked are demanded. From such a viewpoint, it is expected to employ a thermoplastic resin as a matrix resin.

From these viewpoints, thermoplastic resins described in JP 2013-147646 A and WO 2018 021569 A are known as thermoplastic resins excellent in impact resistance. In addition, the fiber-reinforced material described in JP 2018-123284 A is known as a fiber-reinforced material using a thermoplastic resin having excellent impact resistance as a matrix resin. Furthermore, techniques described in JP 2017-82060 A and WO 2017-150702 A are known as techniques for improving affinity between reinforcing fibers and a matrix resin.

JP 2013-147646 A discloses that a thermoplastic resin composition obtained by melt-kneading a polyamide resin, a polyolefin resin, and a compatibilizer can exhibit excellent impact resistance by employing therein a predetermined plant-derived polyamide resin as the polyamide resin.

WO 2018-021569 A discloses that a thermoplastic resin composition obtained by melt-kneading a polyamide resin, a polyolefin resin, and a compatibilizer can exhibit excellent impact resistance by employing therein a polyolefin resin in which Mn is 350,000 or more as the polyolefin resin and a polyamide resin having a structure in which a carbon number of a linear-chain part of a hydrocarbon group sandwiched between adjacent amide bonds in a main chain is 5 or less as the polyamide resin.

JP 2018-123284 A discloses that a fiber-reinforced material and a structure that are hardly cracked are obtained by employing a thermoplastic resin composition obtained by melt-kneading a polyamide resin, a polyolefin resin, and a compatibilizer as a matrix resin.

JP 2017-82060 A and WO 2017-150702 A disclose that interfacial adhesion with a thermoplastic resin can be improved by employing a carbon fiber having thermoplastic resin particles adsorbed on a surface thereof in a carbon fiber-reinforced plastic.

Although a fiber-reinforced material and a structure that are hardly cracked can be obtained by the technique of JP 2018-123284 A, a material having further excellent strength characteristics is demanded.

SUMMARY OF THE INVENTION

Embodiments of the present invention have been made in view of the above circumstances, and an object of the present invention is to provide a fiber-reinforced resin material that is more hardly cracked than before, a method for manufacturing the same, and a fiber-reinforced resin structure that is more hardly cracked than before.

Specifically, the embodiments will be described below.
[1] A fiber-reinforced resin material of a present embodiment is a fiber-reinforced resin material having a laminated structure in which fiber assembly layers and thermoplastic resin layers are alternately located, wherein the fiber assembly layers are each an assembly of continuous fibers having thermoplastic resin particles attached to surfaces thereof, and this fiber-reinforced resin material has a higher elongation on one surface side than that on the other surface side.
[2] In a fiber-reinforced resin material of another embodiment, the thermoplastic resin layer located on the one surface side can be different from the thermoplastic resin layer located on the other surface side.
[3] In a fiber-reinforced resin material of another embodiment, a thermoplastic resin constituting the thermoplastic resin layer located on the one surface side can be a composite resin containing a polyamide and a polyolefin.
[4] In a fiber-reinforced resin material of another embodiment, a fiber content rate on the one surface side can be different from a fiber content rate on the other surface side.
[5] In a fiber-reinforced resin material of another embodiment, the continuous fibers can be carbon fibers.
[6] In a fiber-reinforced resin material of another embodiment, a thermoplastic resin constituting the thermoplastic resin particles can contain a polyamide.
[7] A fiber-reinforced resin structure of a present embodiment is made of the fiber-reinforced resin material of any one of the above-described embodiments.
[8] A method for manufacturing a fiber-reinforced resin material of a present embodiment includes:
a stacking step of stacking a sheet-shaped product of the continuous fibers that serves as the fiber assembly layer and a resin sheet that serves as the thermoplastic resin layer so as to obtain the laminated structure; and
a hot-pressing step of heating and compressing a stacked product obtained through the stacking step in a stacking direction.

The fiber-reinforced resin material and fiber-reinforced resin structure of the present embodiment can provide more excellent difficulty in cracking than that in conventional cases. In particular, high bending stress and bending elastic modulus can be attained together.

The method for manufacturing a fiber-reinforced resin material of the present embodiment can provide a fiber-reinforced resin material and a fiber-reinforced resin structure having more excellent difficulty in cracking than that in conventional cases.

BRIEF DESCRIPTION OF THE DRAWINGS

The present invention will be further described in the following detailed description with reference to the following figures, given non-limiting examples of exemplary embodiments according to the present invention, and like reference symbols represent identical parts through several figures.

DETAILED DESCRIPTION OF PREFERRED EMBODIMENTS

Subjects shown herein are illustrative one and one for describing embodiments of the present invention exemplarily, and are described for providing one believed to be explanation in which the principles and conceptual characteristics of the invention can be understood most effectively and without any difficulty. In this regard, no attempt is made to show structural details of the present invention in more detail than is necessary for the fundamental understanding of the present invention, and the description is taken with the drawings making apparent to those skilled in the art how several forms of the present invention may be embodied in practice.

[1] Fiber-Reinforced Resin Material

Figure 1:
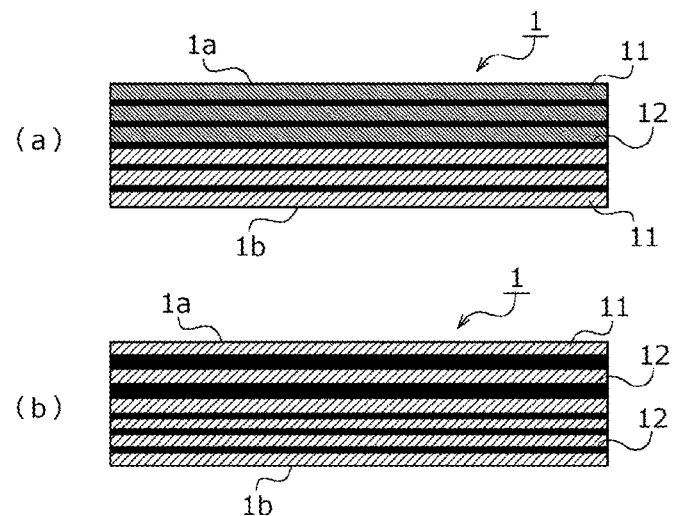
FIG. 1 is an explanatory view for explaining one aspect (a) and another aspect (b) of a fiber-reinforced resin material.

A fiber-reinforced resin material (1) of a present embodiment is a fiber-reinforced resin material (1) having laminated structure in which fiber assembly layers (12) and thermoplastic resin layers (11) are alternately located. The fiber assembly layers (12) are each an assembly of continuous fibers (121) having thermoplastic resin particles (122) attached to surfaces thereof. Furthermore, the fiber-reinforced resin material (1) of the present embodiment has a higher elongation on one surface side (1b) than that on the other surface side (1a) (see FIGS. 1 and 2).

The "fiber assembly layer (12)" (see FIG. 1) is an assembly of continuous fibers 121. The fiber assembly layer 12 may consist only of fibers such as the continuous fibers or may include a binder resin that binds the continuous fibers to each other (prepreg).

The binder resin may be the same resin as or a different resin from the thermoplastic resin constituting the thermoplastic resin layer which will be described later. Furthermore, in the case of different resins, the binder resin may be either a binder resin having a common component resin (for example, a polyimide or a polyolefin) with the thermoplastic resin constituting the thermoplastic resin layer, or a binder resin having no common component resin.

When the fiber assembly layer 12 does not contain a binder resin, the adjacent thermoplastic resin layer 11 can be impregnated into the fiber assembly layer 12 in the present fiber-reinforced resin material 1. By impregnating the thermoplastic resin layer 11 into the fiber assembly layer 12, the fiber assembly layer 12 and the thermoplastic resin layer 11 are firmly integrated, and mechanical characteristics of the present fiber-reinforced resin material 1 can be further improved. In particular, since thermoplastic resin particles 122 are attached to surfaces of the continuous fibers 121, affinity with the thermoplastic resin layer 11 is excellent. Therefore, when the thermoplastic resin layer 11 is melted and fluidized to be impregnated, the thermoplastic resin constituting the thermoplastic resin layer 11 can more easily enter the fiber assembly layer 12.

When the thermoplastic resin layer 11 is impregnated into the fiber assembly layer 12, as a result, in the present fiber-reinforced resin material 1, a laminated structure in which the fiber assembly layers 12 impregnated with the thermoplastic resin and the thermoplastic resin layers 11 remaining without being impregnated thereinto are alternately located is obtained. As a result, this laminated structure can also be said to be a laminated structure in which the fiber assembly layers 12 and the thermoplastic resin layers 11 are alternately located.

The "continuous fibers (121)" (see FIG. 2) constitute the fiber assembly layer 12 and are constituent fibers thereof. The fiber assembly layer 12 and the continuous fibers 121 as constituent fibers thereof serve as a reinforcing material in the fiber-reinforced resin material 1. The fiber assembly layer 12 is formed by assembling the continuous fibers 121. The continuous fibers 121 mean having a long fiber length (being long fibers). Specifically, a fiber length of the continuous fibers 121 can be 15 mm or more. When the fiber length is 15 mm or more, intersection between the continuous fibers can be increased, so that tear strength of the fiber assembly layer 12 can be increased. Furthermore, the fiber length is preferably 50 mm or more, more preferably 100 mm or more, further preferably 500 mm or more. A maximum fiber length is not limited. For example, a structure made of this fiber-reinforced resin material can contain fibers continuous in series from one end to the other end thereof. In this case, the maximum fiber length can be, for example, $1 \times 10^6$ mm or less.

The fiber assembly layer may contain discontinuous fibers (short fibers) having a short fiber length in addition to the continuous fibers. When the fiber assembly layer contains discontinuous fibers, a content of the discontinuous fibers is not limited, but is preferably less than 50 mass %, more preferably 25 mass % or less, particularly preferably 5 mass % or less when a total amount of fibers constituting the fiber assembly layer is 100 mass %. A fiber length of the discontinuous fibers is not limited, and can be less than 15 mm.

The fibers may be assembled in any way in the fiber assembly layer 12. That is, for example, the continuous fibers may be assembled by being aligned, may be woven and assembled like a woven fabric, may be knitted and assembled like a knitted fabric, or may be assembled without being woven like a nonwoven fabric. The fiber assembly layer may consist only of one continuous fiber layer in which continuous fibers are arranged in layers, or may be composed of two or more continuous fiber layers.

A layer thickness of the fiber assembly layer 12 is not limited, and can be, for example, 0.01 μm or more and 5000 μm or less, 0.1 μm or more and 1000 μm or less, 1 μm or more and 500 μm or less, or 5 μm or more and 250 μm or less. A basis weight of the fiber assembly layer is not limited, and may be, for example, 0.1 g/m$^2$ or more and 100,000 g/m$^2$ or less.

The layer thickness of the fiber assembly layer 12 can be measured by scanning electron microscope observation. More specifically, in a still image obtained by enlarging a cross section of the fiber-reinforced resin material in a stacking direction, thicknesses at 10 arbitrary positions are actually measured, and an average value thereof can be taken as the layer thickness.

A material constituting the continuous fibers 121 is not limited. An inorganic material may be used, an organic material may be used, or these materials may be used in combination.

Examples of the inorganic fibers include carbon fibers, activated carbon fibers, glass fibers, ceramic fibers (silicate, titanate, alumina, and the like), metal fibers, and boron fibers. These may be used singly, or two or more thereof may be used in combination.

Examples of the organic fibers include natural fibers and synthetic fibers. These may be used singly, or two or more thereof may be used in combination. Among them, fibers obtained by shaping a synthetic resin into a fiber shape are taken as an example of the synthetic fibers. Examples of such synthetic resin fibers include polyamide resin fibers (such as aliphatic polyamide (e.g., nylon fibers) and aromatic polyamide (e.g., aramid fibers, trade name "KEVLAR")), polyester resin fibers (such as aliphatic polyester and aromatic polyester (e.g., polyethylene terephthalate fibers and polyethylene naphthalate fibers)), polyolefin resin fibers (such as high molecular weight polyolefins (e.g., trade name "DYNEEMA")), and polybenzazole resin fibers (such as polyparaphenylene benzobisoxazole fibers (e.g., trade name "ZYLON")).

The continuous fibers 121 are preferably fibers having a higher tensile strength, and, for example, fibers having a tensile strength of 7 cN/dtex or more (usually, 50 cN/dtex) in accordance with JIS L 1015 are preferred.

Furthermore, a form of the fibers is not limited, and may be a spun yarn, a filament yarn, or a combination thereof. Further, a monofilament may be used, a multifilament may be used, or these filaments may be used in combination.

This fiber-reinforced resin material can have particularly excellent performance especially when carbon fibers are used among the above-described materials.

A type of carbon fibers is not limited, and examples thereof include polyacrylonitrile (PAN)-based carbon fibers and pitch-based carbon fibers. These may be used singly, or two or more thereof may be used in combination.

The number of carbon fibers constituting a carbon fiber bundle (tow) is not limited, and can be, for example, 1000 or more. The number of carbon fibers can be, for example, 1,000 or more and 50,000 or less, further 1,500 or more and 40,000 or less, and further 2,000 or more and 30,000 or less.

A thickness of the carbon fibers is not limited, and, for example, an average diameter can be 1,000 nm or more and 30,000 nm or less, and further 1,000 nm or more and 10,000 nm or less.

A sizing agent may be attached to surfaces of the carbon fibers, but it is preferable that no sizing agent should be attached, from the viewpoint of improving the attachability of the thermoplastic resin particles. When a sizing agent is attached to the surfaces of the carbon fibers, the sizing agent is preferably removed using a sizing remover (for example, acetone, 2-butanone (methyl ethyl ketone), tetrahydrofuran, dichloromethane, or dichloroethane).

Figure 2:
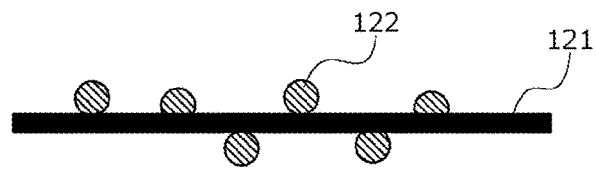
FIG. 2 is an explanatory view of continuous fibers.

The "thermoplastic resin particles (122)" (hereinafter, also simply referred to as "resin particles", see FIG. 2) are particles attached to the surfaces of the continuous fibers 121 constituting the fiber assembly layer 12. By attaching the resin particles 122 to the fiber surfaces, the affinity with the thermoplastic resin constituting the thermoplastic resin layer 11 can be improved. That is, the fiber assembly layer 12 and the thermoplastic resin layer 11 can be more firmly integrated, and a fracture origin between these different materials can be reduced. Thus, when a resin having a high elongation is used as the thermoplastic resin constituting the thermoplastic resin layer 11, interface separation between the thermoplastic resin having a high elongation and the continuous fibers 121 can be more effectively reduced, and the high elongation property of the resin can be more highly utilized.

Attachment of the resin particles 122 to the continuous fibers 121 may be performed by any method. For example, when the continuous fibers 121 are electrically conductive fibers, particularly carbon fibers, the attachment can be performed using the disclosure of JP 2017-82060 A and the disclosure of WO 2017-150702 A. That is, for example, while the continuous fibers are immersed in (1) a colloidal solution containing resin particles, a nonionic surfactant, an electrolyte, and water, or (2) a colloidal solution containing resin particles, a radical polymerization initiator, and water, a voltage is applied to the continuous fibers as a positive electrode or a negative electrode to perform electrophoresis, whereby the resin particles can be attached to the continuous fibers.

A size of the resin particles 122 is not limited, but an average particle diameter can be, for example, 0.02 μm or more and 0.5 μm or less. Further, from the viewpoint of improving an adsorption property to the continuous fibers 121, the average particle diameter can be 0.02 μm or more and 5 μm or less, 0.02 μm or more and 1 μm or less, or 0.02 μm or more and 0.5 μm or less.

The resin particles 122 can be attached to, for example, 30 to 100 area %, or further 60 to 99 area % of the surfaces of the carbon fibers.

The average particle diameter of the resin particles 122 can be measured by scanning electron microscope observation. More specifically, in a still image enlarged using a scanning electron microscope, maximum diameters of arbitrary 20 resin particles attached to the continuous fibers 121 are actually measured, and an average value thereof can be taken as the average particle diameter.

A type of the thermoplastic resin constituting the resin particles 122 attached to the continuous fibers 121 is not limited, and any thermoplastic resin may be used. As the thermoplastic resin, a thermoplastic resin exemplified as a thermoplastic resin constituting the thermoplastic resin layer, which will be described later, can be similarly used.

However, the thermoplastic resin constituting the resin particles 122 and the thermoplastic resin constituting the thermoplastic resin layer may be the same or different.

When they are different from each other, they may or need not have affinity, but, preferably, they have higher affinity from the viewpoint of improving the mechanical characteristics of this fiber-reinforced resin material. Specifically, it is preferable that the thermoplastic resin constituting the resin particles 122 and the thermoplastic resin constituting the thermoplastic resin layer 11 should be the same kind of thermoplastic resin, or should contain the same kind of resin as a component resin. Examples of a case where they are the same kind of thermoplastic resin include cases where they are polyamides, polyolefins, polyesters, and the like. Examples of a case where the thermoplastic resin constituting the resin particles 122 and the thermoplastic resin constituting the thermoplastic resin layer 11 contain the same kind of resin as a component resin include a case where the thermoplastic resin constituting the thermoplastic resin layer 11 is a melt-kneaded product of a polyolefin, a polyamide, and a compatibilizer therefor, and the thermoplastic resin constituting the resin particles 122 contains a polyolefin and/or a polyamide.

The "thermoplastic resin layer (11)" (hereinafter, also simply referred to as "resin layer", see FIG. 1) is a layer in which a resin component constituting the layer is a thermoplastic resin. The resin layer may consist only of a resin component, but may contain any other component such as a filler, in addition to the resin component. Other components will be described later.

A thickness of the resin layer 11 is not limited, but is preferably 5,000 μm or less. The resin layer 11 is a layer located between the fiber assembly layers 12 and is a layer that is not fiber-reinforced. Therefore, the layer thickness is preferably small. When the layer thickness of the resin layer 11 is small, a fiber content rate of this fiber-reinforced resin material 1 can be increased, and the mechanical characteristics can be improved. Specifically, the layer thickness can be 0.1 μm or more and 2000 μm or less, 0.2 μm or more and 500 μm or less, 0.3 μm or more and 250 μm or less, or 0.4 μm or more and 190 μm or less.

The layer thickness of the resin layer 11 can be measured by scanning electron microscope observation. More specifically, in a still image obtained by enlarging a cross section of the fiber-reinforced resin material in a stacking direction, thicknesses at 10 arbitrary positions are actually measured, and an average value thereof can be taken as the layer thickness.

A type of the thermoplastic resin constituting the resin layer 11 is not limited, and examples thereof include polyamides, polyolefins, polyesters, polycarbonates, acrylic resins, fluorine-containing thermoplastic resins, polyimides, polyamideimides, and resin alloys (composite resins) containing two or more of these thermoplastic resins. These may be used singly, or two or more thereof may be used in combination.

Among the above-described ones, the type of polyamides (hereinafter, sometimes simply abbreviated as "PA") is not limited, and examples thereof include PA6, PA66, PA11, PA610, PA612, PA614, PA12, PA6T, PA6I, PAST, PAMST, PA1010, PA1012, PA10T, PAMXD6, PA6T/66, PA6T/6I, PA6T/6I/66, PA6T/2M-5T, and PAST/2M-8T. These polyamides may be used singly, or two or more thereof may be used in combination.

In this fiber-reinforced resin material, PA6, PA66, and the like can be selected from among the polyamides described above, from the viewpoint of versatility, impact resistance, processability, and the like. These may be used singly, or two or more thereof may be used in combination. From the viewpoint of environmental properties (carbon neutral) and sustainability, plant-derived polyamides (polyamides using plant-derived monomers) can be selected from among the polyamides described above. Examples of the plant-derived polyamides include PA11, PA610, PA612, PA614, PA1010, PA1012, and PA10T. These may be used singly, or two or more thereof may be used in combination.

A molecular weight of the polyamide is not limited, and can be, for example, 5,000 or more and 100,000 or less, preferably 7,500 or more and 50,000 or less, and more preferably 10,000 or more and 50,000 or less. This molecular weight is a weight average molecular weight on the polystyrene equivalent basis by gel permeation chromatography (GPC).

Among the above-described ones, the type of polyolefins (hereinafter, sometimes simply abbreviated as "PO") is not limited, and PO includes an olefin homopolymer and/or an olefin copolymer. The olefin constituting PO is not particularly limited, and examples thereof include ethylene, propylene, 1-butene, 3-methyl-1-butene, 1-pentene, 3-methyl-1-pentene, 4-methyl-1-pentene, 1-hexene, and 1-octene. These may be used singly, or two or more thereof may be used in combination. That is, examples of the polyolefins include polyethylene, polypropylene, poly(1-butene), poly(1-hexene), and poly(4-methyl-1-pentene). These polymers may be used singly, or two or more thereof may be used in combination.

Among the above polyolefins, the polyethylene includes an ethylene homopolymer and a copolymer of ethylene and another olefin. Among them, an ethylene-1-butene copolymer, an ethylene-1-hexene copolymer, an ethylene-1-octene copolymer, an ethylene-4-methyl-1-pentene copolymer, and the like are exemplified (50% or more of a total number of constitutional units is derived from ethylene).

Examples of the polypropylene include a propylene homopolymer and a copolymer of propylene and another olefin. Among them, examples of another olefin constituting the copolymer of propylene and another olefin include the above-described various olefins (excluding propylene). Further, the copolymer of propylene and another olefin may be a random copolymer or a block copolymer. In addition, in the copolymer of propylene and another olefin, 50% or more of the total number of constituent units is derived from propylene.

PO referred to herein is a PO having no affinity for PA and having no reactive group capable of reacting with PA. It is different from the compatibilizer for PA and PO in this respect.

Furthermore, the molecular weight of PO is not limited, and can be, for example, 10,000 or more and 700,000 or less, 100,000 or more and 600,000 or less, or 200,000 or more and 550,000 or less.

This molecular weight is a weight average molecular weight on the polystyrene equivalent basis by gel permeation chromatography (GPC). When a homopolymer is used as the polyolefin, values of weight average molecular weight can each be read as values of number average molecular weight.

For example, polyethylene terephthalate and polybutylene terephthalate are exemplified as the polyester, among the above-described thermoplastic resins. These may be used singly, or two or more thereof may be used in combination. For example, PMMA, ABS, and AS are exemplified as the acrylic resin, among the above-described thermoplastic resins. These may be used singly, or two or more thereof may be used in combination. For example, polytetrafluoroethylene is exemplified as the fluorine-containing thermoplastic resin among the above-described thermoplastic resins. These may be used singly, or two or more thereof may be used in combination.

Among the above-described thermoplastic resins, the resin alloy containing two or more thermoplastic resins is not limited, and may contain any combination of thermoplastic resins. However, a composite resin (thermoplastic resin) containing a polyamide and a polyolefin can be selected from the viewpoint of impact resistance, elongation, and processability. As the composite resin containing a polyamide and a polyolefin, (1) the composite resin disclosed in JP 2013-147646 A, (2) the composite resin disclosed in WO 2018-021569 A, and (3) the composite resin disclosed in JP 2018-123284 A can be used.

More specifically, (1) the composite resin disclosed in JP 2013-147646 A is a thermoplastic resin obtained by melt-kneading a polyamide resin, a polyolefin resin, and a compatibilizer, in which the polyamide resin is at least one plant-derived polyamide resin of PA11, PA610, PA614, PA1010, and PA10T, the compatibilizer is an acid-modified olefinic thermoplastic elastomer, a content of the polyamide resin is 1 mass % or more and 80 mass % or less, a content of the polyolefin resin is 5 mass % or more and 75 mass % or less, and a content of the compatibilizer is 1 mass % or more and 30 mass % or less with respect to 100 mass % of a total content of the polyamide resin, the polyolefin resin, and the compatibilizer.

(2) The composite resin disclosed in WO 2018-021569 A is a thermoplastic resin composition obtained by blending a polyolefin resin, a polyamide resin, and a modified elastomer having a reactive group that reacts with the polyamide resin (that is, a compatibilizer), in which the polyolefin resin has a number average molecular weight of 350,000 or more, and the polyamide resin has a structure in which a carbon number of a linear-chain part of a hydrocarbon group sandwiched between adjacent amide bonds in a main chain is 5 or less.

Furthermore, (3) the composite resin disclosed in JP 2018-123284 A is a thermoplastic resin obtained by blending a polyolefin resin, a polyamide resin, and a modified elastomer (compatibilizer) having a reactive group that reacts with the polyamide resin.

As the polyamide used in these composite resins, the above-described polyamide can be used. As the polyolefin used in these composite resins, the above-described polyolefin can be used. Furthermore, as the compatibilizer used in these composite resins, a compatibilizer which will be described below can be used.

The compatibilizer is a modified elastomer having a reactive group that reacts with the polyamide resin. The modified elastomer is preferably an elastomer further exhibiting affinity for the polyamide by utilizing the reactive group as described above and simultaneously exhibiting affinity for the polyolefin. That is, the modified elastomer is preferably a compatibilizer having a reactive group that reacts with the polyamide and having compatibility with both the polyolefin and the polyamide.

In the composite resins, the modified elastomer may be contained as an unreacted modified elastomer, may be contained as a reactant with the polyamide, or may be contained in both forms.

Examples of the reactive group of the compatibilizer include an acid anhydride group (—CO—O—OC—), a carboxyl group (—COOH), an epoxy group {—C$_2$O (a three-membered ring structure composed of two carbon atoms and one oxygen atom)}, an oxazoline group (—C$_3$H$_4$NO), and an isocyanate group (—NCO). These may be used singly, or two or more thereof may be used in combination.

The reactive group can be introduced by modification to an elastomer before modification (unmodified elastomer). Specific examples thereof include an acid-modified elastomer, an epoxy-modified elastomer, and an oxazoline-modified elastomer. Among these, acid-modified products of elastomers are preferred, and modified products of elastomers with acid anhydrides or carboxylic acids are more preferred.

It is particularly preferred that the modified elastomer has an acid anhydride group or a carboxyl group at the side chain or terminal of the molecule. An amount of the acid modification amount is not particularly limited and, for example, the number of acid anhydride groups or carboxyl groups contained in one molecule of the modified elastomer is preferably 1 or more, more preferably 2 or more and 50 or less, still more preferably 3 or more and 30 or less, and particularly preferably 5 or more and 20 or less.

These modified elastomers may be used singly, or two or more thereof may be used in combination.

Examples of the elastomer before modification include an olefinic elastomer and a styrenic elastomer. From the viewpoint of compatibility with the polyolefin, an olefinic elastomer is particularly preferable.

The olefinic elastomer is preferably an α-olefin copolymer containing a structural unit derived from an α-olefin having 3 to 8 carbon atoms, and an ethylene-α-olefin copolymer, an α-olefin copolymer, an α-olefin-nonconjugated diene copolymer, and an ethylene-α-olefin-nonconjugated diene copolymer may be used. Of these, an ethylene-α-olefin copolymer, an α-olefin copolymer, and an ethylene-α-olefin-nonconjugated diene copolymer are particularly preferable.

Examples of the non-conjugated diene include: linear noncyclic diene compounds such as 1,4-pentadiene, 1,4-hexadiene, 1,5-hexadiene, and 1,6-hexadiene; branched chain noncyclic diene compounds such as 5-methyl-1,4-hexadiene, 3,7-dimethyl-1,6-octadiene, 5,7-dimethylocta-1,6-diene, 3,7-dimethyl-1,7-octadiene, 7-methyl octa-1,6-diene, and dihydromyrcene; and alicyclic diene compounds such as tetrahydroindene, methyltetrahydroindene, dicyclopentadiene, bicyclo[2.2.1]hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, and 5-vinyl-2-norbornene.

Specific examples of the olefin elastomer include an ethylene-propylene copolymer, an ethylene-1-butene copolymer, an ethylene-1-pentene copolymer, an ethylene-1-hexene copolymer, an ethylene-1-octene copolymer, a propylene-1-butene copolymer, a propylene-1-pentene copolymer, a propylene-1-hexene copolymer, and a propylene-1-octene copolymer. Of these copolymers, an ethylene-propylene copolymer, an ethylene-1-butene copolymer, and an ethylene-1-octene copolymer are preferred.

Examples of the styrenic elastomer (namely, a styrenic thermoplastic elastomer having a styrene skeleton) include a block copolymer of an aromatic vinyl compound and a conjugated diene compound and a hydrogenated product thereof.

Examples of the aromatic vinyl compound include: alkyl-styrenes such as styrene, α-methylstyrene, p-methylstyrene, and p-tert-butylstyrene; p-methoxystyrene, and vinylnaphthalene.

Examples of the conjugated diene compound include butadiene, isoprene, 1,3-pentadiene, methylpentadiene, phenylbutadiene, 3,4-dimethyl-1,3-hexadiene, and 4,5-diethyl-1,3-octadiene.

Specific examples of the styrenic elastomer include a styrene-butadiene-styrene copolymer (SBS), a styrene-isoprene-styrene copolymer (SIS), a styrene-ethylene/butylene-styrene copolymer (SEBS), and a styrene-ethylene/propylene-styrene copolymer (SEPS).

Examples of the acid anhydride for acid modification include maleic anhydride, phthalic anhydride, itaconic anhydride, succinic anhydride, glutaric anhydride, adipic anhydride, citraconic anhydride, tetrahydrophthalic anhydride, and butenyl succinic anhydride. Of these, maleic anhydride, phthalic anhydride, and itaconic anhydride are preferred.

Examples of the carboxylic acid include acrylic acid, methacrylic acid, maleic acid, fumaric acid, itaconic acid, and citraconic acid.

Among the above-described various modified elastomers, the compatibilizer in the composite resin is preferably an acid anhydride-modified elastomer, particularly preferably a maleic anhydride-modified elastomer, and further preferably an acid-modified product of an α-olefin copolymer containing a structural unit derived from α-olefin having 3 to 8 carbon atoms. Specifically, the compatibilizer is preferably an olefinic thermoplastic elastomer having a copolymer of ethylene or propylene and an α-olefin having 3 to 8 carbon atoms as a skeleton. More specifically the compatibilizer is preferably an elastomer modified with maleic anhydride, such as a maleic anhydride-modified ethylene-propylene copolymer, a maleic anhydride-modified ethylene-1-butene copolymer, a maleic anhydride-modified ethylene-1-hexene copolymer, and a maleic anhydride-modified ethylene-1-octene copolymer. Specifically, α-olefin copolymer "TAFMER series" (trade name) manufactured by Mitsui Chemicals, Inc., "AMPLIFY series" (trade name) manufactured by Dow Chemical Company, or the like can be used.

A molecular weight of the modified elastomer is not limited, and can be, for example, 10,000 or more and 500,000 or less, and is preferably 20,000 or more and 500,000 or less, and more preferably 30,000 or more and 300,000 or less.

The molecular weight of the modified elastomer is a weight average molecular weight on the polystyrene equivalent basis by gel permeation chromatography (GPC).

In addition, the resin layer 11 can contain other components as necessary in addition to the thermoplastic resin described above. Examples of other components include various additives. Examples of the additives include nucleating agents, reinforcing fillers, antioxidants, heat stabilizers, weathering agents, light stabilizers, plasticizers, ultraviolet absorbers, antistatic agents, flame retardants, flame retardant promoters, slip agents, antiblocking agents, antifogging agents, lubricants, pigments, dyes, dispersants, copper inhibitors, neutralizers, foam inhibitors, weld strength improvers, natural oil, synthetic oil, and wax. These may be used singly, or two or more thereof may be used in combination.

Examples of the nucleating agents and reinforcing fillers include: silicates such as talc, silica, clay, montmorillonite, and kaolin; carbonates such as calcium carbonate, lithium carbonate, and magnesium carbonate; metal oxides such as alumina, titanium oxide, and zinc oxide; metals such as aluminum, iron, silver, and copper; hydroxides such as aluminum hydroxide and magnesium hydroxide; sulfides such as barium sulfate; carbides such as charcoal and bamboo charcoal; titanates such as potassium titanate and barium titanate; celluloses such as cellulose microfibril and cellulose acetate; and carbons such as fullerene.

Examples of the antioxidants include phenolic compounds, organic phosphite-based compounds, and thioether-based compounds.

Examples of the heat stabilizers include hindered amine-based compounds.

Examples of the ultraviolet absorbers include benzophenone-based compounds, benzotriazole-based compounds, and benzoate-based compounds.

Examples of the antistatic agents include nonionic compounds, cationic compounds, and anionic compounds.

Examples of the flame retardants include halogen-based compounds, phosphorus-based compounds (such as nitrogen-containing phosphate compounds and phosphoric acid esters), nitrogen-based compounds (such as guanidine, triazine, melamine, or derivatives thereof), inorganic compounds (such as metal hydroxides), boron-based compounds, silicone-based compounds, sulfur-based compounds, and red phosphorus-based compounds.

Examples of flame retardant promoters include antimony compounds, zinc compounds, bismuth compounds, magnesium hydroxide, and clayey silicates.

The "laminated structure" is a structure in which the fiber assembly layers 12 and the resin layers 11 are alternately located. This laminated structure is formed by alternately stacking sheet-shaped products 12' of continuous fibers that serve as the fiber assembly layers 12 and resin sheets 11' that serve as the thermoplastic resin layers 11 at the time of manufacturing this fiber-reinforced resin material 1. More specifically, for example, the present fiber-reinforced resin material 1 can be obtained by heating and pressurizing a stacked product 1' of these alternately stacked sheets in a stacking direction, compressing the stacked product 1', and integrating the sheets. By such an operation, the thermoplastic resin and the fiber assembly layer 12 are firmly integrated, and the fiber-reinforced resin material 1 formed into one layer as a whole can be obtained.

That is, for example, when the fiber assembly layer 12 does not contain a binder resin, the resin layer 11 is impregnated into the fiber assembly layer 12 by performing the above-described operation. When the resin layer 11 is impregnated into the fiber assembly layer 12, as a result, a laminated structure in which the fiber assembly layers 12 impregnated with the thermoplastic resin and the resin layers 11 made of the thermoplastic resin which is not impregnated into the fiber assembly layer 12 and remains between the two fiber assembly layers 12 are alternately located is formed in the present fiber-reinforced resin material 1.

On the other hand, when the fiber assembly layer 12 contains a binder resin, the impregnation of the resin layer into the fiber assembly layer 12 is reduced more or is not performed. That is, when the above operation is performed, the resin layer 11 is not impregnated, or slightly impregnated, into the fiber assembly layer 12. As a result, a laminated structure in which the fiber assembly layers 12 lightly impregnated, or not impregnated, with the thermoplastic resin and the resin layers 11 made of the thermoplastic resin which is not impregnated into the fiber assembly layer 12 and remains between the two fiber assembly layers are alternately located is formed.

The layer thickness of each layer in the present fiber-reinforced resin material is as described above. The number of layers of the laminated structure is not limited, and can be, for example, 2 layers or more and 100,000 layers or less, 3 layers or more and 10,000 layers or less, 4 layers or more and 1,000 layers or less, or 5 layers or more and 100 layers or less.

This fiber-reinforced resin material may consist only of the above-described laminated structure, or may include a non-laminated structure. Examples of the non-laminated structure include a site made only of a thermoplastic resin having a thickness 10 times or more the thickness of the resin layer. However, it is considered that this fiber-reinforced resin material can exhibit more excellent mechanical characteristics due to the fact that it consists only of a laminated structure.

This fiber-reinforced resin material has a higher elongation on one surface side 1b than that on the other surface side 1a. The reason why the elongation on the one surface side 1b is different from that on the other surface side 1a as described above can be said to be because this fiber-reinforced resin material 1 has a laminated structure. That is, since it has a laminated structure, a structural difference can be given to each layer, and, as a result, the elongation on the one surface side 1b and that on the other surface side 1a can be made different.

In the laminated structure, a layer region having a large elongation is soft, and has a relatively small maximum strength. Conversely, a layer region having a small elongation is hard, and has a relatively large maximum strength. Therefore, when a layer region having a relatively high elongation is disposed on the one surface side 1b and a layer region having a relatively low elongation is disposed on the other surface side 1a, it is possible to impart a mechanical characteristic such that the elongation on the one surface side 1b becomes higher than that on the other surface side 1a and stress gradually decreases after arrival at maximum stress. That is, it is considered that toughness can be imparted to the fiber-reinforced resin material 1.

In addition, the mechanical characteristic such that the stress gradually decreases after arrival at the maximum stress is particularly excellent when the fiber-reinforced resin material 1 has the characteristic that the elongation on the one surface side 1b is higher than that on the other surface side 1a, in a gradient manner. The phrase "has . . . in a gradient manner" means that the elongation is approximately "large→small" from the one surface side 1b toward the other surface side 1a. More specifically, it may be, for example, "large→large→small", "large→small→small", "large→large→small→small", "large→large→large→small", or "large→small→small→small" Further, it may be, for example, "large→medium→small", "large→medium→small→small", "large→large→medium→small", or "large→medium→small→small" In any case, it is sufficient that the elongation gradually decreases from the one surface side 1b toward the other surface side 1a.

In the fiber-reinforced resin material 1, for example, in a case where the elongation is changed depending on the type of the thermoplastic resin constituting the resin layer 11, the fiber assembly layers 12 and the resin layers 11 are alternately located, and thus may be arranged, for example, as follows: "small (fiber assembly layer)→large (resin layer)→small (fiber assembly layer)→medium (resin layer)→small (fiber assembly layer)→ . . . ", for example, when the elongation is measured, for each layer, from the one surface side 1b toward the other surface side 1a. This is because the elongation of the fiber assembly layer 12 is lower than that of the resin layer 11. However, even in such an arrangement, the elongation of the resin layer 11, which is a main change component, is changed and decreased, and thus the elongation can be said to be gradient.

As described above, in this fiber-reinforced resin material 1, the configuration in which the elongation on the one surface side 1b is higher than that on the other surface side 1a, in other words, a layer region having a high elongation is disposed on the one surface side 1b and a layer region having a low elongation is disposed on the other surface side 1a, is not limited, and the fiber-reinforced resin material 1 may be formed so as to have any configuration. For example, it can be formed so as to have the following configuration (1) or (2). It may be formed so as to have any other configuration than (1) and (2), and these configurations in which these elongations are made different may be used singly, or two or more thereof may be used in combination.

(1) The thermoplastic resin layer 11 located on the one surface side 1b is different from the thermoplastic resin layer 11 located on the other surface side 1a, so that the elongation on the one surface side 1b can be made different from that on the other surface side 1a (see FIG. 1A).

(2) The fiber content rate on the one surface side 1b is different from the fiber content rate on the other surface side 1a, so that the elongation on the one surface side 1b can be made different from that on the other surface side 1a (see FIG. 1B).

Of the above-described configurations, the configuration (1) in which the thermoplastic resin layer 11 located on the one surface side 1b is different from the thermoplastic resin layer 11 located on the other surface side 1a, so that the elongation on the one surface side 1b is made higher than the elongation on the other surface side 1a can be realized by disposing a thermoplastic resin having a relatively high elongation on the one surface side 1b and disposing a thermoplastic resin having a relatively low elongation on the other surface side 1a.

More specifically, the configuration can be realized by using a composite resin of a polyamide and a polyolefin (having a higher elongation than that of the polyamide) as the thermoplastic resin located on the one surface side 1b and using the polyamide (having a higher strength than that of the composite resin) as the thermoplastic resin located on the other surface side 1a among the thermoplastic resins described above.

In this combination, the composite resin contains the polyamide, and thus excellent affinity with the polyamide can be exhibited. For this reason, it is considered that peeling in a boundary region where the two thermoplastic resins are in contact with each other can be suppressed even when these two thermoplastic resins are used. In addition, for example, when polyamide particles are selected as the resin particles 122 to be attached to the continuous fibers 121, affinity between the continuous fibers 121 and the composite resin can be improved, and the affinity between the continuous fibers 121 and the polyamide can be improved.

That is, the above-described configuration can be used to firmly bond the fiber assembly layer 12 and the resin layer 11 (a resin layer using a composite resin and a resin layer using a polyamide), and also firmly bond the resin layer 11 using a composite resin and the resin layer 11 using a polyamide, so that integrity of the obtained fiber-reinforced resin material 1 can be improved. Thus, the fiber-reinforced resin material 1 can function as an integrated material as a whole while being made of a plurality of different materials. In addition, since the elongation on the one surface side 1b is higher than that on the other surface side 1a, excellent toughness can be exhibited.

Of the above-described configurations, the configuration (2) in which the fiber content rate on the one surface side 1b is different from the fiber content rate on the other surface side 1a, so that the elongation on the one surface side 1b is made higher than the elongation on the other surface side 1a can be realized by disposing the fiber assembly layer 12 having a relatively low fiber content rate on the one surface side 1b and disposing the fiber assembly layer 12 having a relatively high fiber content rate on the other surface side 1a.

Such a fiber assembly layer having a low fiber content rate is a fiber assembly layer in which an amount of continuous fibers contained in the thermoplastic resin is relatively small (density is low), and thus is a layer in which the properties of the thermoplastic resin are more strongly exhibited. That is, when the amount of continuous fibers is small, the fiber assembly layer has a high elongation. On the other hand, the fiber assembly layer having a high fiber content rate is a fiber assembly layer in which the amount of continuous fibers contained in the thermoplastic resin is relatively large (density is high), and thus is a layer in which the properties of the thermoplastic resin are less likely to be exhibited. That is, when the amount of continuous fibers is large, the fiber assembly layer has a low elongation.

In the case of the configuration (2), the thermoplastic resin constituting the resin layer 11 is not limited. For example, by using a polyolefin as the thermoplastic resin constituting the resin particles 122 to be attached to the continuous fibers 121 and similarly using a polyolefin as the thermoplastic resin constituting the resin layer 11, affinity between them can be improved. Also, by using a polyamide as the thermoplastic resin constituting the resin particles 122 to be attached to the continuous fibers 121 and similarly using a polyamide as the thermoplastic resin constituting the resin layer 11, the affinity between them can be improved. Further, by using a polyamide as the thermoplastic resin constituting the resin particles 122 to be attached to the continuous fibers 121 and using a composite resin of a polyamide and a polyolefin as the thermoplastic resin constituting the resin layer 11, the affinity between them can be improved.

With these configurations, the fiber assembly layer 12 and the resin layer 11 can be firmly bonded, and the integrity of the obtained fiber-reinforced resin material 1 can be improved. Thus, the fiber-reinforced resin material 1 can function as an integrated material as a whole while being made of a plurality of different materials. In addition, since the elongation on the one surface side 1b is higher than that on the other surface side 1a, excellent toughness can be exhibited.

In the present fiber-reinforced resin material, the fact that the one surface side 1b has a higher elongation than the other surface side 1a is determined by dividing this fiber-reinforced resin material 1 into two layers at a center of the thickness thereof and measuring a fracture elongation at the same thickness of a one surface side layer and the other surface side layer. In addition, the fracture elongation is measured, using an autograph, as an elongation at a fracture point of a test piece by performing a tensile test at the same tensile speed while the one surface side layer and the other surface side layer are identical in test piece thickness and test piece length.

For example, in the case where a fiber-reinforced resin material having a gradient of physical properties is formed according to the above configuration (1) and two types, i.e., a composite resin of a polyamide and a polyolefin and a polyamide, are used as the thermoplastic resins to be used for the resin layer 11, it is preferable that the number of interfaces between the resin layer using the composite resin and the resin layer using the polyamide should be smaller. From such a viewpoint, it is possible to obtain the fiber-reinforced resin material 1 having a two-layer layer structure in which two stacked portions 21 and 22, i.e., the stacked portion 21 in which the resin layers 11 using a composite resin and the fiber assembly layers 12 are alternately stacked and the stacked portion 22 in which the resin layers 11 using a polyamide and the fiber assembly layers 12 are alternately stacked are integrated.

In such a fiber-reinforced resin material 1, a gradient of elongation can be realized while the elongation on the one surface side 1b is higher than that on the other surface side 1a. In addition, the number of interfaces at which the different thermoplastic resins are in contact with each other can be reduced to substantially one. Therefore, particularly excellent mechanical characteristics can be obtained. Specifically, significantly high bending stress and bending elastic modulus can be attained together. Furthermore, significantly high bending stress, bending elastic modulus, and breaking strain can be attained together.

In the fiber-reinforced resin material 1 having a two-layer structure in which the two stacked portions 21 and 22 are integrated, the stacked portion 21 on the one surface side 1b has a higher elongation than that of the stacked portion 22 on the other surface side 1a. The two stacked portions 21 and 22 may have the same thickness or different thicknesses, but a higher bending stress can be realized when they have different thicknesses. Furthermore, when the thickness of the stacked portion 21 on the one surface side 1b is larger than the thickness of the stacked portion 22 on the other surface side 1a, a higher bending stress can be realized. More specifically, when the thickness of the stacked portion 21 on the one surface side 1b is $D_1$ (mm) and the thickness of the stacked portion 22 on the other surface side 1a is $D_2$ (mm), a particularly excellent bending stress can be realized in the range of $0.5<D_2/D_1<1.0$. This thickness ratio is further preferably $0.55<D_2/D_1<0.95$, more preferably $0.60<D_2/D_1<0.90$, and still more preferably $0.65<D_2/D_1<0.85$.

The fiber-reinforced resin material according to the present invention need not or may have other layers than the fiber assembly layer 12, the resin layer 11, and the laminated structure. Examples of the other layers include a design layer and a joint layer (a layer used for joint to another material). These may be used singly, or two or more thereof may be used in combination.

A use mode of the present fiber-reinforced resin material 1 is not limited, and, for example, either the one surface side 1b (relatively high elongation side) or the other surface side 1a (relatively low elongation side) may be used as an impact input side. Of these, by using the other surface side 1a (relatively low elongation side) as the impact input side, dramatically high mechanical characteristics can be exhibited as compared with the case where the one surface side 1b (relatively high elongation side) is used as the impact input side. In particular, remarkably high toughness can be exhibited. Specifically, it is possible to improve the bending stress by 150% or more (further 175% or more and 300% or less, or further 200% or more and 260% or less) relative to the bending stress when the one surface side 1b (relatively high elongation side) is used as the impact input side, while maintaining the bending elastic modulus when the other surface side 1a (relatively low elongation side) is used as the impact input side.

In addition, a shape, a size, and the like of this fiber-reinforced resin material are not limited, and the fiber-reinforced resin material can have appropriate shape and size as necessary.

For example, as shown in the Examples which will be described later, when carbon fibers are selected as the continuous fibers 121, a polyamide is selected as the resin particles 122, and the above-described composite resin and polyamide (particularly, polyamide 6) are selected as the thermoplastic resins constituting the resin layer 11, as this fiber-reinforced resin material, and the fiber-reinforced resin material 1 having a laminated structure in which a carbon fiber content rate is 20 to 60 vol % is obtained using six layers of resin sheets (211) made of the composite resin and having a thickness of 10 to 250 μm, six layers of resin sheets (221) made of the polyamide and having a thickness of 50 to 150 μm, and sheet-shaped products 212 and 222 made of the continuous fibers 121 which are carbon fibers, the obtained fiber-reinforced resin material can have a bending stress of 300 MPa or more (further 350 MPa or more and 650 MPa or less, or further 450 MPa or more and 600 MPa or less), a bending elastic modulus of 30 GPa or more (further 35 GPa or more and 65 GPa or less, or further 40 GPa or more and 55 GPa or less), and a breaking strain of 3 mm % or more (further 3.5 mm % or more and 6.0 mm % or less, or further 3.8 mm % or more and 5.7 mm % or less).

As the composite resin, (1) a composite resin of a melt-kneaded product of plant-derived PA and a compatibilizer (particularly, an acid-modified olefin-based elastomer) and a polyolefin, which has a phase structure with PO as a parent phase, can be selected. In this composite resin, when a total amount of the plant-derived PA, the PO, and the compatibilizer is 100 mass %, the plant-derived PA can be used in an amount of 10 mass % or more and 40 mass % or less (further 15 mass % or more and 35 mass % or less), the PO can be used in an amount of 40 mass % or more and 75 mass % or less (further 45 mass % or more and 70 mass % or less), and the compatibilizer can be used in an amount of 5 mass % or more and 35 mass % or less (further 10 mass % or more and 30 mass % or less).

Further, (2) a composite resin of a melt-kneaded product of PA6 and a compatibilizer (particularly, an acid-modified olefin-based elastomer) and a polyolefin having a number average molecular weight of 350,000 or more (further 450,000 or more) can be selected. In this composite resin, when a total amount of the PA6, the PO, and the compatibilizer is 100 mass %, the PA6 can be used in an amount of 15 mass % or more and 65 mass % or less (further 35 mass % or more and 55 mass % or less), the PO can be used in an amount of 15 mass % or more and 65 mass % or less (further 20 mass % or more and 45 mass % or less), and the compatibilizer can be used in an amount of 5 mass % or more and 35 mass % or less (further 10 mass % or more and 30 mass % or less).

Further, (3) a composite resin of a melt-kneaded product of PA and a compatibilizer (particularly, an acid-modified olefin-based elastomer) and a polyolefin, which has a co-continuous phase structure in which both a phase with PA as a parent phase and a phase with PO as a parent phase exist, can be selected. In this composite resin, when a total amount of the PA, the PO, and the compatibilizer is 100 mass %, the PA can be used in an amount of 15 mass % or more and 70 mass % or less (further 35 mass % or more and 65 mass % or less), the PO can be used in an amount of 15 mass % or more and 65 mass % or less (further 20 mass % or more and 50 mass % or less), and the compatibilizer can be used in an amount of 5 mass % or more and 35 mass % or less (further 7 mass % or more and 30 mass % or less).

[2] Method for Manufacturing Fiber-Reinforced Resin Material

The fiber-reinforced resin material described above may be produced in any manner, but can be manufactured by a method including a stacking step and a hot-pressing step.

Of these steps, the stacking step is a step of stacking the sheet-shaped products 12' of the continuous fibers 121 that serve as the fiber assembly layers 12 and the resin sheets 11' that serve as the thermoplastic resin layers 11 so as to obtain a laminated structure.

Figure 3:
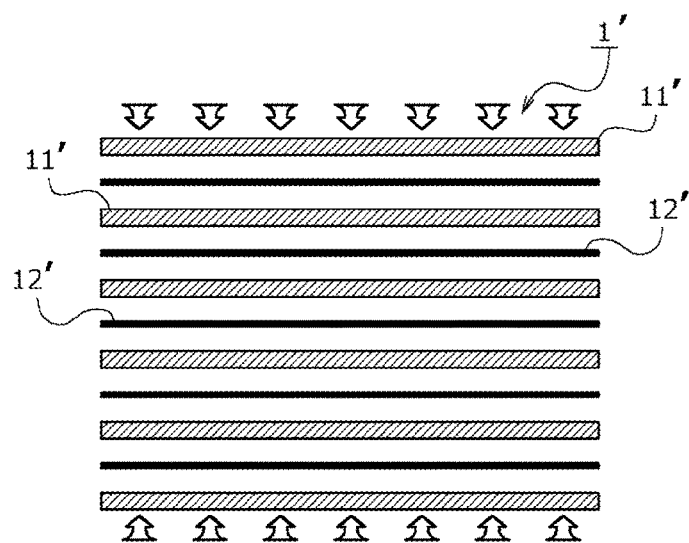
FIG. 3 is an explanatory view for explaining an outline of a method for manufacturing a fiber-reinforced resin material.

The hot-pressing step is a step of heating and compressing the stacked product 1' obtained through the stacking step in a stacking direction (see FIG. 3).

The "sheet-shaped product (12')" is a sheet-shaped product that serves as the fiber assembly layer 12, and is obtained by assembling the continuous fibers 121 in a sheet shape. The continuous fibers 121 are as described above, and are substantially unchanged before and after the fiber-reinforced resin material 1 is formed. In the sheet-shaped product 12', the continuous fibers 121 may be assembled in any manner. That is, for example, the continuous fibers 121 may be assembled by being aligned, may be woven and assembled like a woven fabric, may be knitted and assembled like a knitted fabric, or may be assembled without being woven like a nonwoven fabric. The sheet-shaped product may consist only of one continuous fiber layer in which continuous fibers are arranged in layers, or may be composed of two or more continuous fiber layers.

The "resin sheet (11')" is a sheet-shaped material containing the thermoplastic resin which is the resin component of the thermoplastic resin layer 11. The thermoplastic resin constituting the resin sheet 11' is as described above, and is substantially unchanged before and after the fiber-reinforced resin material is formed.

In the stacking step, the sheet-shaped product 12' and the resin sheet 11' only need be stacked so as to obtain a target laminated structure. However, at the time of stacking, they may be stacked so as to obtain the target laminated structure by one hot-pressing step, but may be stacked so as to obtain the target laminated structure through two or more hot-pressing steps. That is, for example, it is also possible to form a second stacked product 22' having a stacked structure on the one surface side 1b and a first stacked product 21' having a stacked structure on the other surface side 1a, separately heat and compress these stacked products to obtain a second laminated structure 22' and a first laminated structure 21', further stack these structures, and then heat and compress the obtained stacked product to obtain the target fiber-reinforced resin material 1. That is, the sheets can be finally integrated through such separate stacking to obtain the fiber-reinforced resin material 1.

In addition, at the time of each stacking, an adhesive or the like for adhering the sheets so that the sheets are not separated from each other before the hot-pressing step may be interposed or need not be interposed.

In addition, a heating temperature and a pressurizing pressure to be applied in the hot-pressing step are not limited, and can be set within appropriate ranges depending on the type of the thermoplastic resin to be used. For example, when the polyamide is selected as the resin particles 122 and the composite resin and polyamide described above are selected as the thermoplastic resins constituting the resin layer 11, the heating temperature can be 140° C. or more and 270° C. or less, 160° C. or more and 260° C. or less, and 180° C. or more and 250° C. or less. The pressurizing pressure can be more than 0 MPa and 9.81 MPa or less, more than 0 MPa and 9.0 MPa or less, and more than 0 MPa and 7.0 MPa or less.

In addition, when a plurality of hot-pressing steps are imposed in obtaining one fiber-reinforced resin material 1, the heating temperature and the pressurizing pressure in each step may be the same or different.

[3] Fiber-Reinforced Resin Structure

The fiber-reinforced resin structure of the present embodiment is made of the fiber-reinforced resin material described above. This fiber-reinforced resin structure can also be referred to as a fiber-reinforced resin molded body.

An application of this fiber-reinforced resin structure is not particularly limited, and the fiber-reinforced resin structure can be used as, for example, exterior materials, interior materials, structural materials (body shell, vehicle body, and aircraft body), and impact absorbing materials for automobiles, railway vehicles, ships, airplanes, and the like. Among them, examples of automobile supplies include exterior materials for automobiles, interior materials for automobiles, structural materials for automobiles, shock absorbers for automobiles, and components in engine rooms.

Specific examples of the automobile supplies include a bumper, a spoiler, a cowling, a front grille, a garnish, a hood, a cargo room lid, a cowl louver, a fender panel, a rocker molding, a door panel, a roof panel, an instrument panel, a center cluster, a door trim, a quarter trim, a roof lining, a pillar garnish, a deck trim, a tonneau board, a package tray, a dashboard, a console box, a kicking plate, a switch base, a seat back board, a seat frame, an arm rest, a sun visor, an intake manifold, energy absorbers such as an engine head cover, an engine under cover, an oil filter housing, a housing for on-vehicle electronic component (ECU, TV monitor, etc.), an air filter box, and a rush box, and body shell constituent parts such as a front end module.

Further, examples of the application of the fiber-reinforced resin structure include interior materials, exterior materials, and structural materials for buildings or furniture. That is, the product can be a door covering material, a door structural material, a covering material of various types of furniture (desk, chair, shelf, chest of drawers, etc.), or a structural material, and further, a modular bath, a septic tank, or the like. In addition, the fiber-reinforced resin structure can be used as a packaging body, an accommodating body (tray etc.), a protecting member, a partition member, and the like. Further, the fiber-reinforced resin structure can be a molded body such as housings and structures for household electric appliances (slim-type TV, refrigerator, washing machine, vacuum cleaner, mobile phone, portable game machine, note type personal computer, etc.).

EXAMPLES

Hereinafter, the present invention will be specifically described by way of examples.

[1] Materials Used (1-1) Sheet-Shaped Product $W_{PA6}$ (PA6 Particles)

As the continuous fibers 121, carbon fibers to which PA6 particles were attached were used. As base carbon fibers, the product name "HTS 40" (24K) manufactured by Toho Tenax Co., Ltd. was used. A sizing material on surfaces of the base carbon fibers was removed, and then the base carbon fibers were immersed in a colloidal liquid which will be described below, and electrophoresis was performed at 30 V for 30 seconds to obtain a sheet-shaped product $W_{PA6}$ (12') of the continuous fibers 121 in which PA6 particles 122 were attached to about 30 to 100 area % of the surfaces of the base carbon fibers.

Colloidal liquid: a liquid containing 750 mg of PA6 particles (average particle diameter: 12 μm), 75 g of water, 400 mg of a surfactant (sodium dodecyl sulfate, SDS), and 50 mg of potassium chloride.

(1-2) Sheet-Shaped Product $W_{PMMA}$ (PMMA Particles)

As the continuous fibers 121, carbon fibers to which PMMA particles were attached were used. As base carbon fibers, the product name "HTS 40" (24K) manufactured by Toho Tenax Co., Ltd. was used. A sizing material on surfaces of the base carbon fibers was removed, and then the base carbon fibers were immersed in a colloidal liquid which will be described below, and electrophoresis was performed at 30 V for 30 seconds to obtain a sheet-shaped product $W_{PMMA}$ (12') of the continuous fibers 121 in which PMMA particles 122 were attached to about 30 to 100 area % of the surfaces of the base carbon fibers.

Colloidal liquid: a liquid containing 750 mg of PMMA particles (average particle diameter: 0.25 μm), 75 g of water, 400 mg of a surfactant (sodium dodecyl sulfate, SDS), and 50 mg of potassium chloride.

(1-3) Sheet-Shaped Product $W_{NON}$ (Without Resin Particle)

As the continuous fibers, carbon fibers to which no resin particle was attached were used. As base carbon fibers, the product name "HTS 40" (24K) manufactured by Toho Tenax Co., Ltd. was used. The carbon fibers were aligned and used as a sheet-shaped product $W_{NON}$ (12').

(1-4) Resin Sheet Using PA6

Resin sheet $S_{PA6}$: a sheet (11') obtained by molding PA6 (product name: "CM1001" manufactured by Toray Industries, Inc.) pellets into a thickness of 70 to 110 μm by hot pressing.

(1-5) Resin Sheet Using Composite Material C1

Composite material C1: a composite material of PP, PA11 and a compatibilizer, having a PP parent phase (manufactured by TOYOTA BOSHOKU CORPORATION), specifically, a composite material obtained by melt-kneading polypropylene (homopolymer having a weight average molecular weight of 320,000), PA11 (manufactured by Arkema, product name "Rilsan BMN O", weight average molecular weight: 18,000), and a compatibilizer (maleic anhydride-modified ethylene-butene copolymer, manufactured by Mitsui Chemicals, Inc., product name "TAFMER MH7020") at a mass ratio of 55%:25%:20% (melt-kneaded product of a melt-kneaded product of PA11 and the compatibilizer, and PP).

Resin sheet $S1_{C1}$: a sheet (11') obtained by molding the composite material C1 into a thickness of 50 μm.

Resin sheet $S2_{C1}$: a sheet (11') obtained by molding the composite material C1 into a thickness of 160 μm.

Resin sheet $S3_{C1}$: a sheet (11') obtained by molding the composite material C1 into a thickness of 200 μm.

(1-6) Resin Sheet Using Composite Material C2

Composite material C2: a composite material of PP, PA6, and a compatibilizer, having both PP and PA parent phases (co-continuous phase) (manufactured by TOYOTA BOSHOKU CORPORATION), specifically, a composite material obtained by melt-kneading polypropylene (homopolymer having a weight average molecular weight of 320,000), PA6 (weight average molecular weight: 18,000), and a compatibilizer (maleic anhydride-modified ethylene-butene copolymer, manufactured by Mitsui Chemicals, Inc., product name "TAFMER MH7020") at a mass ratio of 32.5%:42.5%:25% (melt-kneaded product of a melt-kneaded product of PA6 and the compatibilizer, and PP).

Resin sheet $S_{C2}$: a sheet (11') obtained by molding the composite material C2 into a thickness of 160 μm.

(1-7) Resin Sheet Using Composite Material C3

Composite material C3: a composite material of PP, PA6, and a compatibilizer, having a PA parent phase (manufactured by TOYOTA BOSHOKU CORPORATION), specifically, a composite material obtained by melt-kneading polypropylene (homopolymer having a weight average molecular weight of 520,000), PA6 (weight average molecular weight: 18,000), and a compatibilizer (maleic anhydride-modified ethylene-butene copolymer, manufactured by Mitsui Chemicals, Inc., product name "TAFMER MH7020") at a mass ratio of 32.5%:42.5%:25% (melt-kneaded product of a melt-kneaded product of PA6 and the compatibilizer, and PP).

Resin sheet $S_{C3}$: a sheet (11') obtained by molding the composite material C3 into a thickness of 160 μm.

(1-8) Resin Sheet Using TPU

Thermoplastic polyurethane elastomer resin: manufactured by Okura Industrial Co., Ltd., product name "Silkron ET80".

Resin sheet $S_{TPU}$: a sheet (11') obtained by molding TPU into a thickness of 150 μm.

Figure 7:
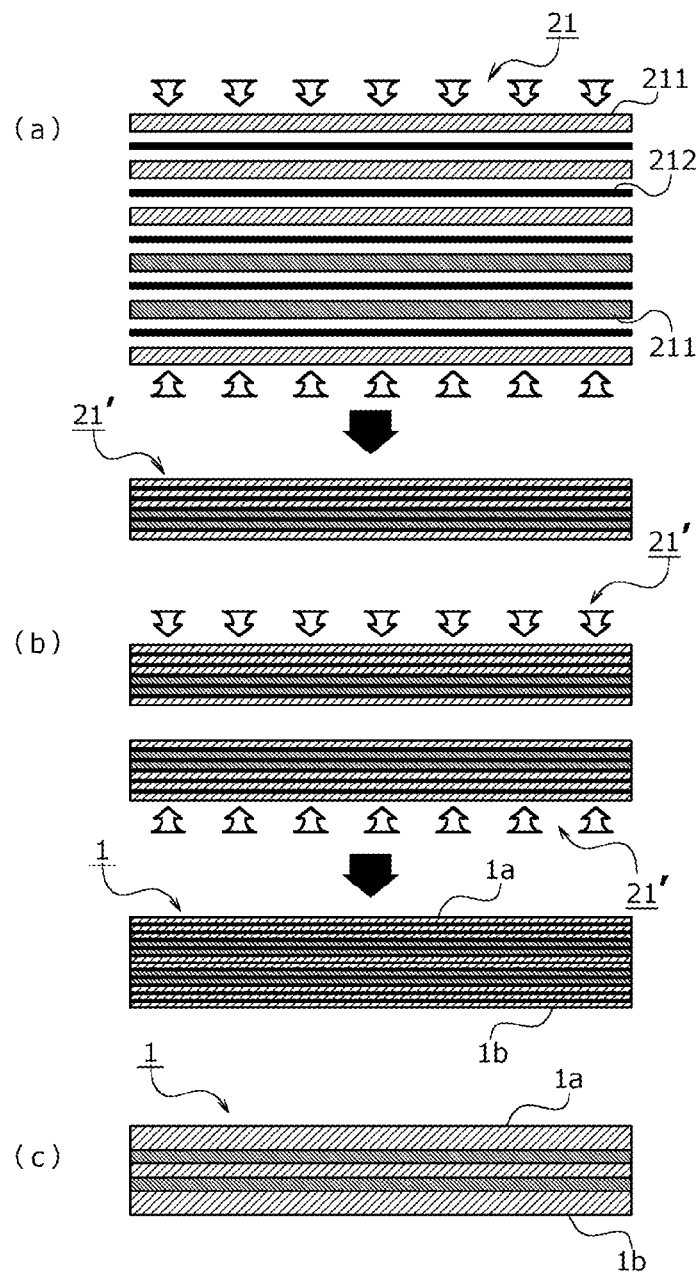
FIG. 7 is an explanatory view of a fiber-reinforced resin material having a laminated structure A used in an experimental example.

[2] Preparation of Fiber-Reinforced Resin Material (1-1) Fiber-Reinforced Resin Material Having Laminated Structure A As shown in FIGS. 7A to 7B, four resin sheets $S_{PA6}$, eight resin sheets $S2_{C1}$, and 10 sheet-shaped products $W_{PA6}$ were stacked so as to attain a laminated structure A (laminated structure of a comparative example) shown in FIG. 7C, and then heated and pressurized under conditions of a temperature of 230° C. and a pressure of 0.3 to 5.0 MPa to obtain a fiber-reinforced resin material having the laminated structure A of Experimental Examples 1 and 2 (see FIG. 7).

(1-2) Fiber-Reinforced Resin Material Having Laminated Structure B

Figure 8:
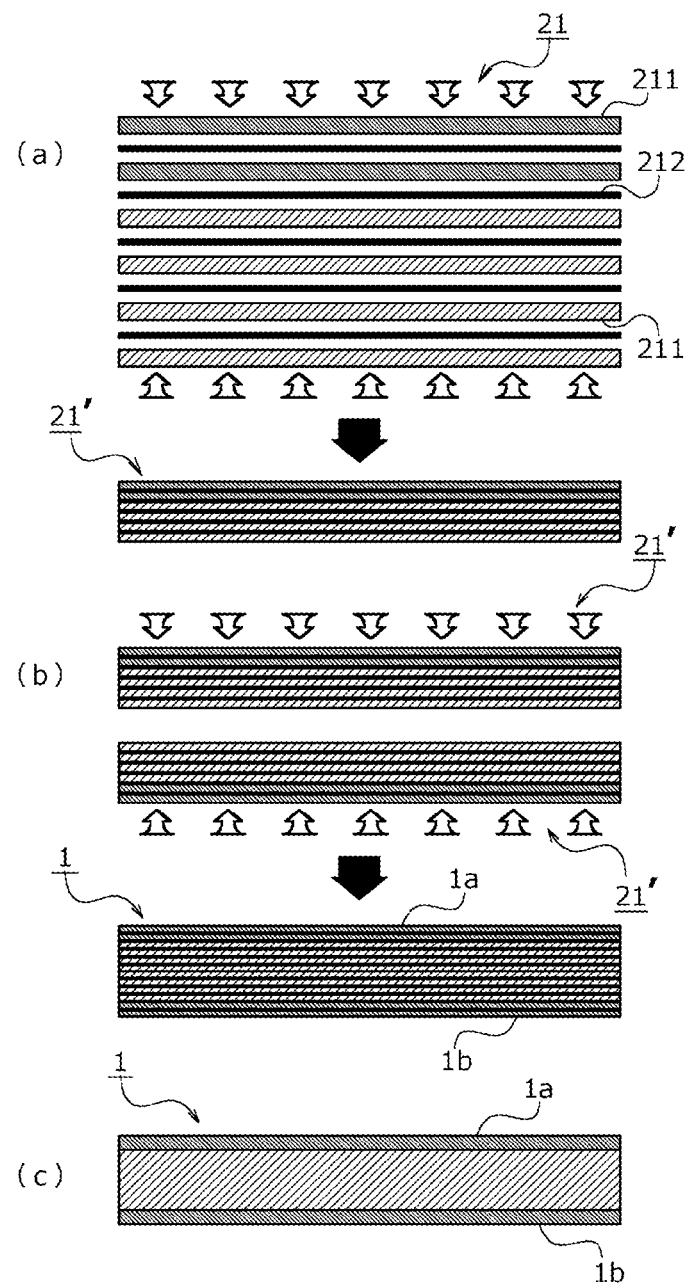
FIG. 8 is an explanatory view of a fiber-reinforced resin material having a laminated structure B used in an experimental example.

As shown in FIGS. 8A to 8B, four resin sheets $S_{PA6}$, eight resin sheets $S2_{C1}$, and 10 sheet-shaped products $W_{PA6}$ were stacked so as to attain a laminated structure B (laminated structure of a comparative example) shown in FIG. 8C, and then heated and pressurized under conditions of a temperature of 230° C. and a pressure of 0.3 to 5.0 MPa to obtain a fiber-reinforced resin material having the laminated structure B of Experimental Examples 3 and 4 (see FIG. 8).

(1-3) Fiber-Reinforced Resin Material Having Laminated Structure C

Figure 9:
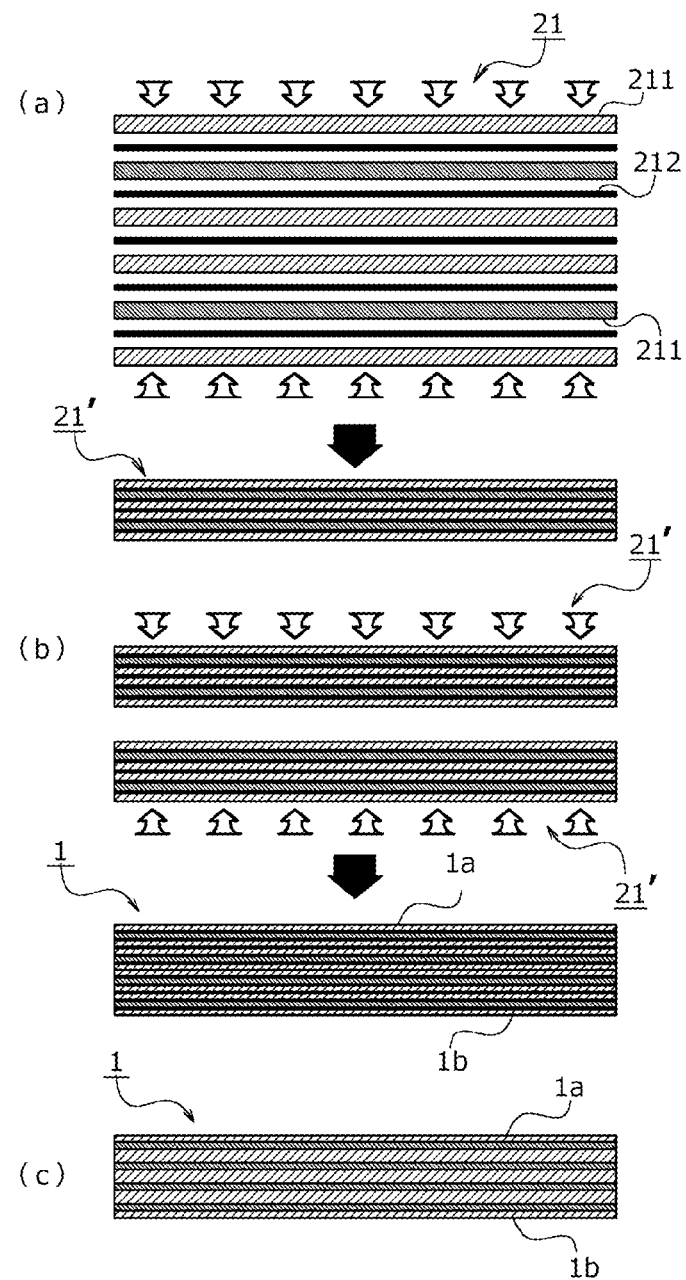
FIG. 9 is an explanatory view of a fiber-reinforced resin material having a laminated structure C used in an experimental example.

As shown in FIGS. 9A to 9B, four resin sheets $S_{PA6}$, eight resin sheets $S2_{C1}$, and 10 sheet-shaped products $W_{PA6}$ were stacked so as to attain a laminated structure C (laminated structure of a comparative example) shown in FIG. 9C, and then heated and pressurized under conditions of a temperature of 230° C. and a pressure of 0.3 to 5.0 MPa to obtain a fiber-reinforced resin material having the laminated structure C of Experimental Examples 5 to 8 (see FIG. 9).

(1-4) Fiber-reinforced resin material having laminated structure D

Figure 10:
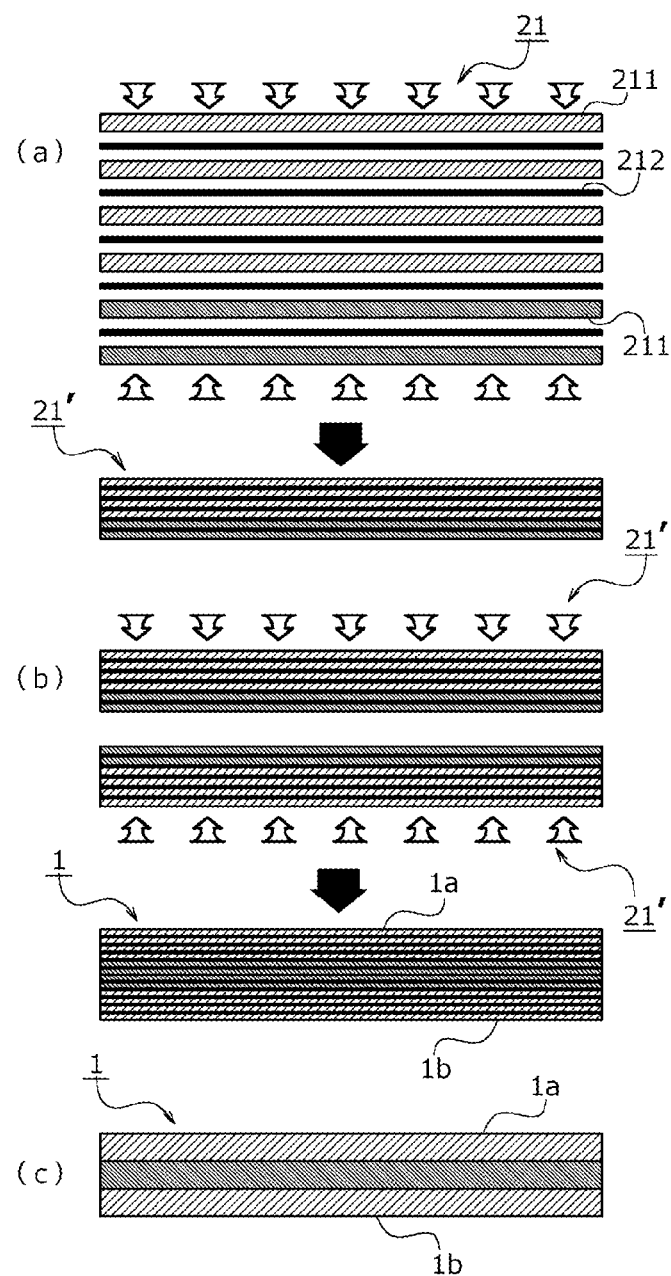
FIG. 10 is an explanatory view of a fiber-reinforced resin material having a laminated structure D used in an experimental example.

As shown in FIGS. 10A to 10B, four resin sheets $S_{PA6}$, eight resin sheets $S2_{C1}$, and 10 sheet-shaped products $W_{PA6}$ were stacked so as to attain a laminated structure D (laminated structure of a comparative example) shown in FIG. 10C, and then heated and pressurized under conditions of a temperature of 230° C. and a pressure of 0.3 to 5.0 MPa to obtain a fiber-reinforced resin material having the laminated structure D of Experimental Examples 9 and 10 (see FIG. 10).

(1-5) Fiber-Reinforced Resin Material Having Laminated Structure E

Four resin sheets $S_{PA6}$, eight resin sheets $S2_{C1}$, and 10 sheet-shaped products $W_{PA6}$ were stacked so as to attain a laminated structure E shown in FIG. 6E, and then heated and pressurized under conditions of a temperature of 230° C. and a pressure of 0.3 to 5.0 MPa to obtain a fiber-reinforced resin material having the laminated structure E (laminated structure of an Example) of Experimental Examples 11 and 12 (see FIG. 6E).

Figure 4:
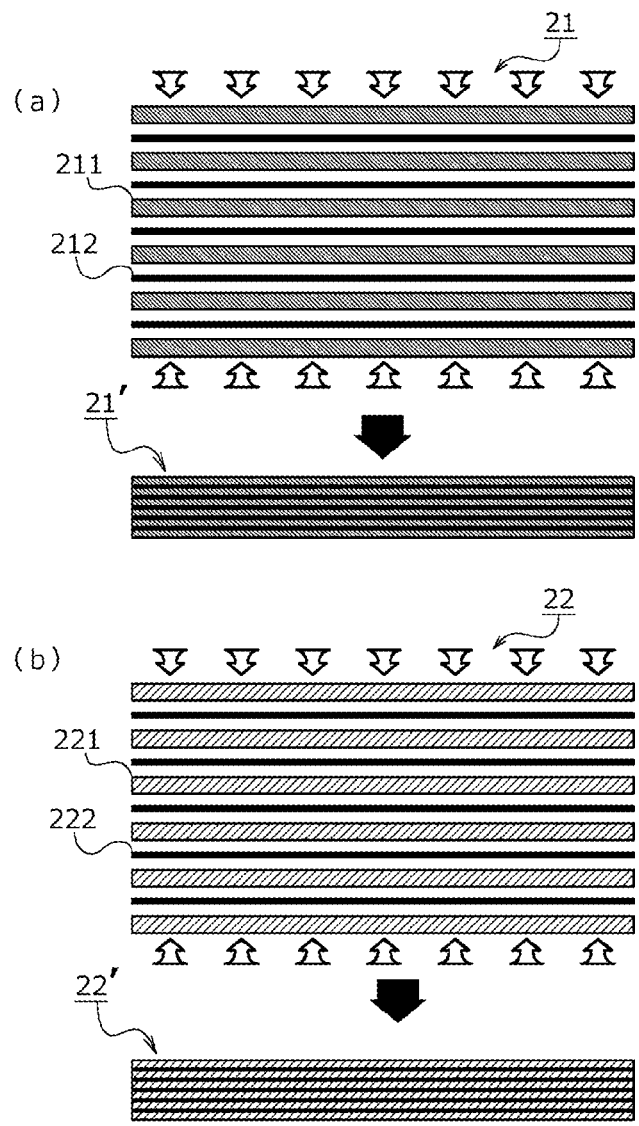
FIG. 4 is an explanatory view of a method for manufacturing one aspect (laminated structures E and F) of the fiber-reinforced resin material.
Figure 5:
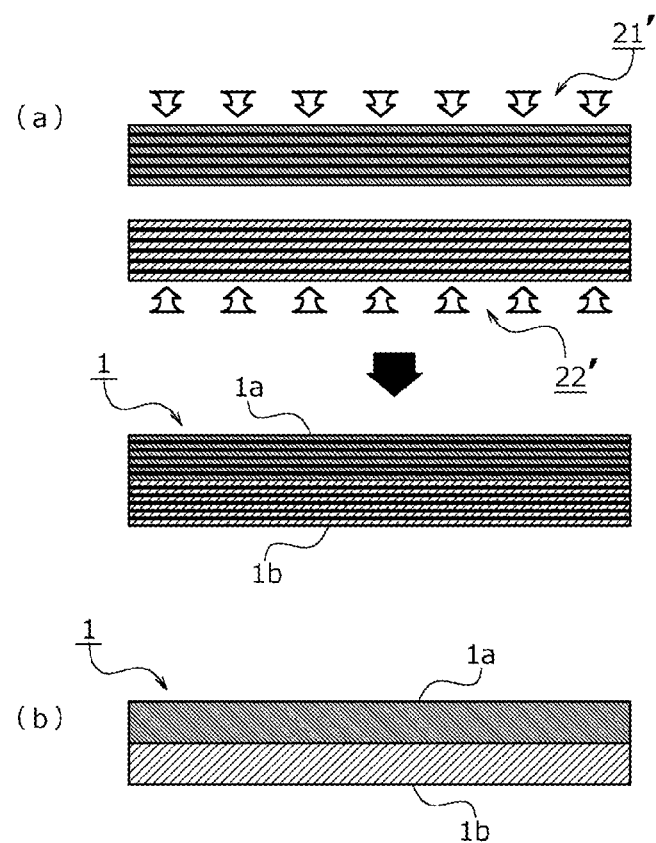
FIG. 5 is an explanatory view of the method for manufacturing the one aspect of the fiber-reinforced resin material, following FIG. 4.

Six resin sheets $S_{PA6}$, six resin sheets $S2_{C1}$, and 10 sheet-shaped products $W_{PA6}$ were stacked so as to attain a laminated structure E shown in FIG. 5B, and then heated and pressurized under conditions of a temperature of 230° C. and a pressure of 0.3 to 5.0 MPa to obtain a fiber-reinforced resin material having the laminated structure E (laminated structure of an Example) of Experimental Examples 13 and 14 (see FIGS. 4 and 5).

Actually, as shown in FIG. 4A, a first stacked product obtained by alternately stacking six resin sheets $S_{PA6}$ (211) and five sheet-shaped products $W_{PA6}$ (212) is heated and compressed to obtain a first laminated structure 21'. Further, as shown in FIG. 4B, a second stacked product obtained by alternately stacking six resin sheets $S2_{C2}$ (221) and five sheet-shaped products $W_{PA6}$ (222) is heated and compressed to obtain a second laminated structure 22'. Thereafter, as shown in FIG. 5A, the first laminated structure 21' and the second laminated structure 22' are stacked and further heated and compressed to obtain a fiber-reinforced resin material 1 having the laminated structure E. When the fiber-reinforced resin material 1 having the laminated structure E is simply represented, as shown in FIG. 5B, the fiber-reinforced resin material 1 in which the second laminated structure 22 is located on the one surface side 1b and the first laminated structure 21 is located on the other surface side 1a is obtained.

(1-6) Fiber-Reinforced Resin Material Having Laminated Structure F

Six resin sheets $S_{PA6}$, six resin sheets $S2_{C1}$, and 10 sheet-shaped products $W_{PA6}$ were stacked so as to attain a laminated structure F in which the structure shown in FIG. 5B was turned upside down, and then heated and pressurized under conditions of a temperature of 230° C. and a pressure of 0.3 to 5.0 MPa to obtain a fiber-reinforced resin material having the laminated structure F (laminated structure of an Example) of Experimental Examples 15 and 16 (see FIGS. 4 and 5).

TABLE 1

| | | Laminated structure | Resin sheet $S_{PA6}$ | Resin sheet $S_{C1}$ | Sheet-shaped product $W_{PA6}$ | Fiber content rate $V_f$ (vol %) | Bending stress (MPa) | Bending elastic modulus (GPa) | Breaking strain (mm %) |
|---|---|---|---|---|---|---|---|---|---|
| Experimental Example | 1 | A | Resin: PA6 | Resin: Composite resin C1 | Resin particles: PA6 | 34 | 315 | 39.6 | 4.75 |
| | 2 | | Thickness: 70 to 110 μm | | | | 357 | 46.4 | 4.30 |
| | 3 | B | | | | | 412 | 45.0 | 4.21 |
| | 4 | | Number of sheets used: 4 | Thickness: 160 μm | Number of sheets used: 10 | | 487 | 45.3 | 4.23 |
| | 5 | C | | | | | 245 | 34.3 | 5.15 |
| | 6 | | | Number of sheets used: 8 | | | 348 | 42.1 | 4.19 |
| | 7 | | | | | | 300 | 36.9 | 4.30 |
| | 8 | | | | | | 243 | 35.0 | 3.81 |

TABLE 1-continued

| Laminated structure | Resin sheet $S_{PA6}$ | Resin sheet $S_{C1}$ | Sheet-shaped product $W_{PA6}$ | Fiber content rate $V_f$ (vol %) | Bending stress (MPa) | Bending elastic modulus (GPa) | Breaking strain (mm %) |
|---|---|---|---|---|---|---|---|
| 9 | D | | | | 289 | 43.5 | 5.45 |
| 10 | | | | | 279 | 41.6 | 5.05 |
| 11 | E | | | | 457 | 40.5 | 5.51 |
| 12 | | | | | 520 | 47.1 | 5.42 |
| 13 | E | Resin: PA6 | Resin: Composite resin C1 | Resin particles: PA6 | 36 | 540 | 50.6 | 4.15 |
| 14 | | Thickness: 70 to 110 μm | Thickness: 160 μm | Number of sheets used: 10 | | 552 | 42.0 | 4.51 |
| 15 | F | Number of sheets used: 6 | Number of sheets used: 6 | | | 308 | 49.9 | 1.89 |
| 16 | | | | | 208 | 39.3 | 3.90 |

(1-7) Fiber-Reinforced Resin Material Having Laminated Structure E

Figure 6:
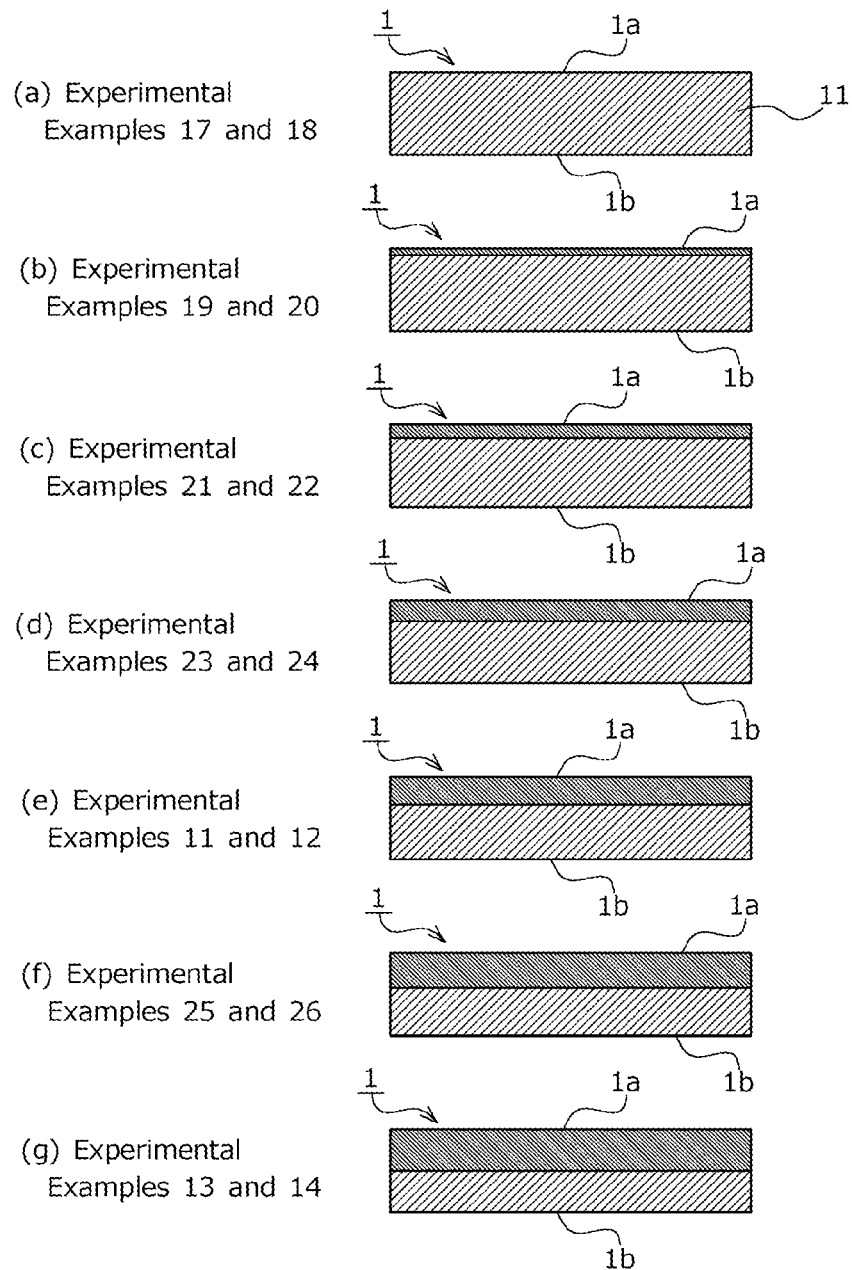
FIG. 6 is an explanatory view of a fiber-reinforced resin material used in an experimental example.

One to six resin sheets $S_{PA6}$ indicated in Table 2, six to 11 resin sheets $S2_{C1}$ indicated in Table 2, and 10 sheet-shaped products $W_{PA6}$ were stacked so as to attain the laminated structure E shown in FIG. 5B, and then heated and pressurized under conditions of a temperature of 230° C. and a pressure of 0.3 to 5.0 MPa to obtain a fiber-reinforced resin material having the laminated structure E (laminated structure of an Example) of Experimental Examples 11 to 14 and 19 to 26 (see FIGS. 4, 5, and 6). FIGS. 4 and 5 show examples in which six resin sheets $S_{PA6}$ and six resin sheets $S2_{C1}$ were used.

In addition, a fiber-reinforced resin material of Experimental Examples 17 and 18 (laminated structure of a comparative example) using 12 resin sheets $S2_{C1}$ and 10 sheet-shaped products $W_{PA6}$ was obtained by the same preparation method.

TABLE 2

| | | Laminated structure | Resin sheet $S_{PA6}$ Number of sheets used | Resin sheet $S2_{C1}$ Number of sheets used | Sheet-shaped product $W_{PA6}$ | Fiber content rate $V_f$ (vol %) | Bending stress (MPa) | Bending elastic modulus (GPa) | Breaking strain (mm %) |
|---|---|---|---|---|---|---|---|---|---|
| Experimental Example | 17 | | 0 | 12 | Resin particles: PA6 Number of sheets used: 10 | 30 | 190 | 29.5 | 2.65 |
| | 18 | | | | | | 206 | 33.3 | 2.59 |
| | 19 | E | 1 | 11 | | 31 | 317 | 43.0 | 4.34 |
| | 20 | | | | | | 312 | 40.6 | 5.05 |
| | 21 | | 2 | 10 | | 32 | 345 | 47.1 | 4.40 |
| | 22 | | | | | | 415 | 55.7 | 4.14 |
| | 23 | | 3 | 9 | | 33 | 438 | 44.5 | 4.27 |
| | 24 | | | | | | 454 | 52.1 | 4.06 |
| | 11 | | 4 | 8 | | 34 | 457 | 40.5 | 5.51 |
| | 12 | | | | | | 520 | 47.1 | 5.42 |
| | 25 | | 5 | 7 | | 35 | 583 | 52.0 | 5.07 |
| | 26 | | | | | | 635 | 53.2 | 4.48 |
| | 13 | | 6 | 6 | | 36 | 540 | 50.6 | 4.15 |
| | 14 | | | | | | 552 | 42.0 | 4.51 |

(1-8) Fiber-Reinforced Resin Material Having Laminated Structure G

Each resin sheet indicated in Table 3 and each sheet-shaped product indicated in Table 3 were stacked, and then heated and pressurized under conditions of a temperature of 230° C. and a pressure of 0.3 to 5.0 MPa to obtain a fiber-reinforced resin material having a laminated structure G (laminated structure of a comparative example) of Experimental Examples 29 to 50.

TABLE 3

| | | Laminated structure | Resin sheet | Sheet-shaped product | Fiber content rate $V_f$ (vol %) | Bending stress (MPa) | Bending elastic modulus (GPa) | Breaking strain (mm %) |
|---|---|---|---|---|---|---|---|---|
| Experimental Example | 27 | G | $S3_{C1}$ Composit material: C1 200 μm | $W_{NON}$ | 26 | 101 | 12.2 | 6.64 |
| | 28 | | | | | 107 | 14.6 | 6.98 |
| | 29 | | | $W_{PA6}$ | 26 | 153 | 15.1 | 6.24 |
| | 30 | | | | | 173 | 16.4 | 5.92 |

TABLE 3-continued

| Laminated structure | Resin sheet | Sheet-shaped product | Fiber content rate $V_f$ (vol %) | Bending stress (MPa) | Bending elastic modulus (GPa) | Breaking strain (mm %) |
|---|---|---|---|---|---|---|
| 31 | $S2_{C1}$ | $W_{PA6}$ | 30 | 185 | 16.8 | 2.75 |
| 32 | Composit material: C1 160 µm | | | 211 | 19.9 | 2.59 |
| 33 | $S1_{C1}$ | $W_{PA6}$ | 58 | 398 | 56.4 | 4.15 |
| 34 | Composit material: C1 50 µm | | | 394 | 49.0 | 4.65 |
| 35 | $S_{TPU}$ | $W_{PA6}$ | 32 | 47 | 4.9 | 5.62 |
| 36 | 150 µm | | | 44 | 4.2 | 5.70 |
| 37 | $S_{C2}$ | $W_{NON}$ | 30 | 123 | 17.9 | 4.69 |
| 38 | Composit | | | 97 | 13.5 | 7.05 |
| 39 | material: C2 | $W_{PA6}$ | 30 | 180 | 28.5 | 5.75 |
| 40 | 160 µm | | | 171 | 25.8 | 6.12 |
| 41 | | $W_{PMMA}$ | 30 | 151 | 25.5 | 5.60 |
| 42 | | | | 110 | 15.7 | 7.38 |
| 43 | $S_{C3}$ | $W_{NON}$ | 30 | 203 | 25.8 | 4.42 |
| 44 | Composit | | | 186 | 20.4 | 5.33 |
| 45 | material: C3 | $W_{PA6}$ | 30 | 260 | 37.4 | 6.43 |
| 46 | 160 µm | | | 208 | 43.1 | 6.43 |
| 47 | | $W_{PMMA}$ | 30 | 285 | 35.9 | 5.91 |
| 48 | | | | 220 | 33.2 | 5.64 |

(2) Three-Point Bending Test

A test piece (a width of 12 mm, a thickness of 2.4 mm, and a length of 100 mm) was subjected to a three-point bending test at a distance between fulcrums of 80 mm and a bending speed of 5 mm/min in accordance with JIS K 7074, and the bending stress, the bending elastic modulus and the breaking strain were measured, and are indicated in Tables 1 to 3.

The above-mentioned examples are for illustrative purposes only and are not to be construed as limiting the invention. While the invention has been described by way of examples of typical embodiments, it is understood that the language used in the description and illustration of the present invention is to be regarded as explanatory and illustrative and not restrictive. Modifications within the scope of the appended claims are possible without departing from the scope or spirit of the invention in its form as detailed herein. Although reference has been made herein to specific structures, materials and examples in the detailed description of the present invention, it is not intended to limit the invention to the disclosure set forth herein, but rather, to cover all functionally equivalent structures, methods, and uses within the scope of appended claims.

What is claimed is:

1. A fiber-reinforced resin material having a laminated structure in which fiber assembly layers and thermoplastic resin layers are alternately located, wherein
   the fiber assembly layers are each an assembly of continuous fibers having thermoplastic resin particles attached to surfaces of the continuous fibers,
   one of the fiber assembly layers provided on a first surface side of the laminated structure has a fiber content rate that is different from a fiber content rate of another of the fiber assembly layers provided on a second surface side of the laminated structure, and
   an elongation of the fiber-reinforced resin material on one surface side is higher than an elongation of the fiber-reinforced resin material on the other surface side.

2. The fiber-reinforced resin material according to claim 1, wherein one of the thermoplastic resin layers located on the first surface side is different from another of the thermoplastic resin layers located on the other surface side.

3. The fiber-reinforced resin material according to claim 2, wherein a thermoplastic resin constituting the one of the thermoplastic resin layers located on the first surface side is a composite resin containing a polyamide and a polyolefin.

4. The fiber-reinforced resin material according to claim 1, wherein the continuous fibers are carbon fibers.

5. The fiber-reinforced resin material according to claim 1, wherein a thermoplastic resin constituting the thermoplastic resin particles contains a polyamide.

6. A fiber-reinforced resin structure comprising the fiber-reinforced resin material according to claim 1.

7. A method for manufacturing the fiber-reinforced resin material according to claim 1, the method comprising:
   alternately stacking sheet-shaped products of the continuous fibers that serves as the fiber assembly layers and resin sheets that serves as the thermoplastic resin layers so as to obtain the laminated structure; and
   heating and compressing a stacked product obtained through the alternate stacking.

8. A fiber-reinforced resin material having a laminated structure in which fiber assembly layers and thermoplastic resin layers are alternately located, wherein
   the fiber assembly layers are each an assembly of continuous fibers having thermoplastic resin particles attached to surfaces of the continuous fibers,
   one of the thermoplastic resin layers that is impregnated into a corresponding one of the fiber assembly layers and located on a first surface side is different from another of the thermoplastic resin layers that is impregnated into a corresponding one of the fiber assembly layers and located on a second surface side, and
   an elongation of the fiber-reinforced resin material on one surface side is higher than an elongation of the fiber-reinforced resin material on the other surface side.

9. The fiber-reinforced resin material according to claim 8, wherein a thermoplastic resin of the one of the thermoplastic resin layers is a composite resin containing a polyamide and a polyolefin.

10. The fiber-reinforced resin material according to claim 8, wherein a fiber content rate on the first surface side is different from a fiber content rate on the second surface side.

11. The fiber-reinforced resin material according to claim 8, wherein the continuous fibers are carbon fibers.

12. The fiber-reinforced resin material according to claim 8, wherein a thermoplastic resin constituting the thermoplastic resin particles contains a polyamide.

13. A fiber-reinforced resin structure comprising the fiber-reinforced resin material according to claim 8.

14. A method for manufacturing the fiber-reinforced resin material according to claim 8, the method comprising:
   alternately stacking sheet-shaped products of the continuous fibers that serves as the fiber assembly layers and resin sheets that serves as the thermoplastic resin layers so as to obtain the laminated structure; and
   heating and compressing a stacked product obtained through the alternate stacking.

* * * * *